United States Patent [19]

Buch et al.

[11] 3,737,793

[45] June 5, 1973

[54] DC LEVEL RESTORING CIRCUIT

[75] Inventors: Roman Buch, Chicago; Louis L. Kocsis, Elmhurst, both of Ill.

[73] Assignee: Zenith Radio Corporation, Chicago, Ill.

[22] Filed: July 1, 1968

[21] Appl. No.: 741,462

[52] U.S. Cl. ....................330/11, 330/24, 330/30 D, 330/51

[51] Int. Cl. ....................H03f 21/00

[58] Field of Search ....................330/11, 51

[56] References Cited

UNITED STATES PATENTS 3,139,590 6/1964 Brown ....................330/51 X 3,237,116 2/1966 Skinner et al. ....................330/9

*Primary Examiner*—Nathan Kaufman

*Attorney*—John J. Pederson and John H. Coult

[57] ABSTRACT

There is described a DC level restoring circuit for an AC coupled, ultra-low frequency differential amplifier of the type used in conjunction with an electrocardioscope. A sensing circuit, in the form of a balanced differential amplifier is used to determine the presence of transient pulses at the output of the ECG amplifier and actuate two switches, one at the input AC coupling device and one at the output AC coupling device, to restore the AC coupling devices to their respective operating DC signal levels.

4 Claims, 2 Drawing Figures

Patented June 5, 1973 3,737,793

Inventors
Roman Buch
Louis L. Kocsis
By John J. Pederson
Attorney

DC LEVEL RESTORING CIRCUIT

BACKGROUND OF THE INVENTION efforts.

In conjunction with many surgical operations, there is a particular need for an electrocardiogram (ECG) amplifier capable of sufficiently amplifying a patient's cardiac signal and rendering it free from interference or "noise" signals in a manner that requires a minimum amount of attention and readjustment by the operator or physician. Such an amplifier is used with an electrocardioscope or an electrocardiograph to provide a visual display or written record of certain cardiac characteristics (pulse rate, fibrillation, etc.) which indicate the condition of the patient's heart. Thus, the doctor performing the operation may utilize this type of system to periodically check the condition of the patient's heart during the operation without substantially hindering his surgical efforst.

Conventional electrocardioscope amplifiers employ a relatively high degree of signal gain in order to amplify the cardiac signal sufficiently for visual display purposes. Inherent with high signal gain is a large amount of interference signal ("noise") inasmuch as the transducer used to detect the cardiac signal also picks up random ambient signals which are likewise greatly amplified. It has been found that differential amplifiers are very well suited for such an application because of their inherent capability of substantially cancelling such extraneous noise signals within the amplifier itself.

Another consideration for a high quality ECG amplifier is the frequency response. It has been found that a desirable bandwidth (as measured at the frequency limits which are three decibels below the average signal level) for an ECG amplifier is from 0.08 to 200 hertz. The upper limit of this bandwidth is readily obtainable by simple circuitry. Satisfactorily achieving the lower frequency limit, however, requires a much more sophisticated structure.

Direct coupling may be used to obtain an extremely low frequency response but, for a differential amplifier input, this requires an extremely well matched—and therefore expensive—pair of input transistors (or vacuum tubes) in order to minimize imbalance in the amplifier with temperature variations. Moreover, the signal obtained by DC coupling is largely subject to DC voltages generated by the electrode-body connections and by electrode polarization which varies greatly with time and in most cases tends to eventually saturate a direct coupled amplifier. That is, in addition to providing a source of AC voltage signals (cardiac signals, for example), the human body also provides DC signals which vary throughout the human body primarily because of differences in electrode-skin contact potentials and sweat chemistry, and therefore tend to unbalance the differential amplifier even more.

To overcome the DC input voltage problem and at the same time achieve the desirable ultra-low frequency response, relatively large capacitance coupling capacitors may be used to AC couple the input signal from the body to the input of the differential amplifier. The capacitance of the output coupling capacitor may also be large for similar reasons. Ultra-low frequency response is thus obtained and the amplifier input is isolated from DC signals. These large values of capacitance, however, are capable of storing relatively large amounts of electric charge. Furthermore, in applications of this nature, high input impedances are very desirable for optimum common mode rejections, attenuation, and adjustment considerations. Consequently, the time constant established by the combination of high capacity — high impedance circuitry is rather large; a time constant of several minutes is typical for such a circuit. Thus, when the input transducer receives a large transient pulse signal, such as when a defibrillator is discharged across a patient's heart, the resulting transient pulse is picked up by the input transducer of the ECG amplifier and causes the coupling capacitors to store an electric charge sufficient to completely override the cardiac signal. Thus, because of these saturation effects, the amplifier is temporarily paralyzed for several minutes until the coupling capacitors discharge to their normal operating level. This temporary paralysis and consequent interruption of the monitoring capability of the electrocardioscope or electrocardiograph for several minutes at a critical time during an operation is intolerable.

It is therefore an object of this invention to provide a new and improved AC coupled, ultra-low-frequency ECG amplifier which is essentially free from the effects of disruption caused by relatively large transient pulses that lead to temporary paralysis and consequent interruption of the monitoring capability of the electrocardioscope or electrocardiograph.

SUMMARY OF THE INVENTION

In accordance with the invention, a new and improved electrocardioscope of the type including an AC coupling ultra-low-frequency main amplifier for translating ECG signals, which amplifier includes AC coupling elements normaly operating under predetermined DC conditions but subject to disruption by extraneous interference transients leading to temporary paralysis and consequent interruption of the monitoring capability of the electrocardioscope, incoudes a system for preventing such paralysis comprising means coupled to the amplifier for sensing the transient and developing a predetermined control effect in response thereto. Means including a switch responsive to the control effect for restoring the AC coupling element to the predetermined DC operating condition are also provided.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the two figures of which like reference numerals identify like elements, and in which:

DESCRIPTION OF THE PREFERRED EMBODIMENT

Figures 1, 2:
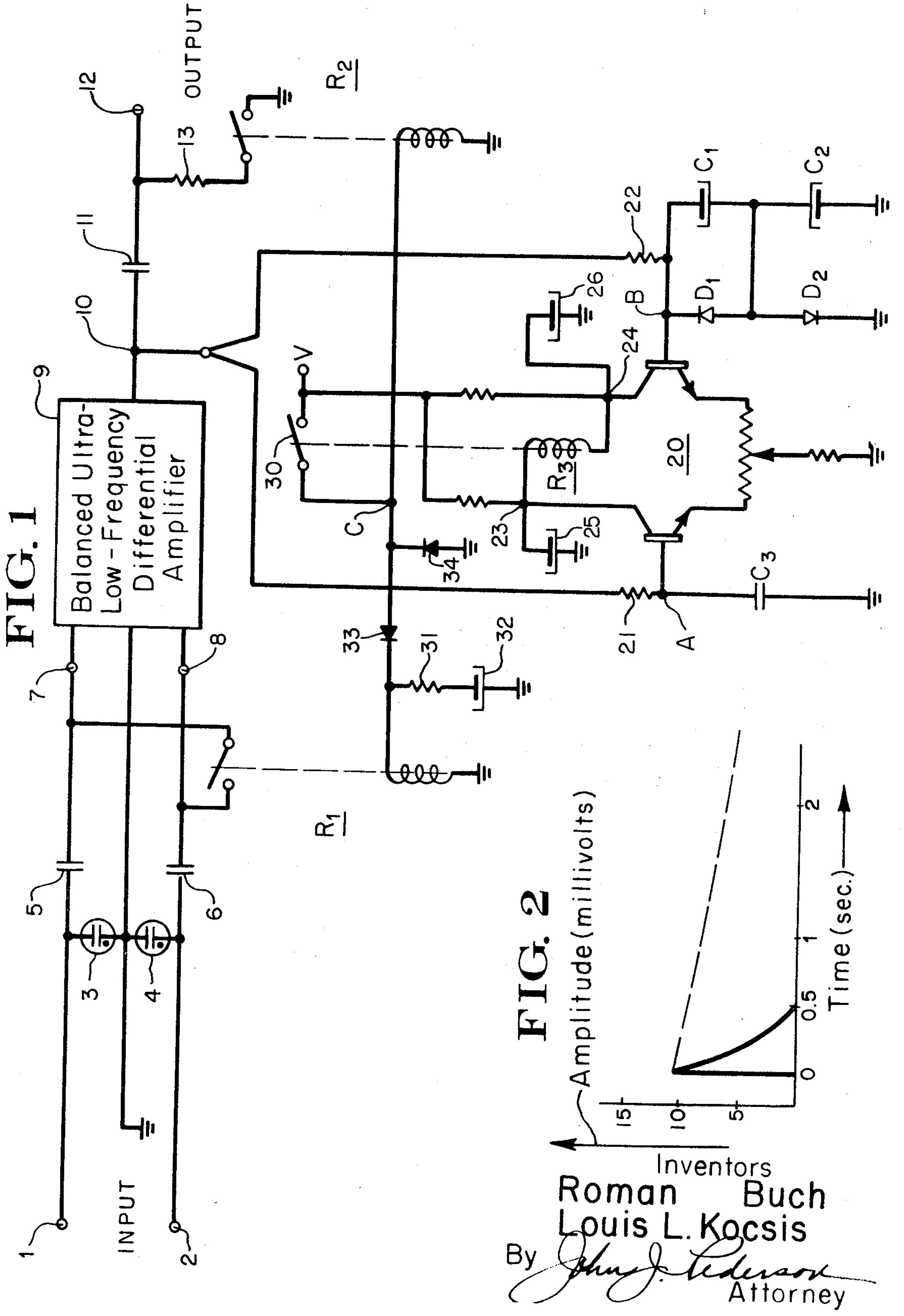
FIG. 1 is a schematic diagram for an AC coupled ultra-low-frequency electrocardioscope amplifier which embodies the principles of the present invention.
FIG. 2 is a graphical representation of the recovery time of the amplifier.

With reference to FIG. 1, there is shown schematically an amplifier system suitable for use with an electrocardioscope comprising a pair of input terminals 1 and 2 to which the cardiac signal from a patient is applied. A pair of neon bulbs 3 and 4 are respectively connected from the wires connected to terminals 1 and 2 to ground in order to protect the input circuit from the damaging effects of high-voltage transients such as defibrillator discharge pulses. A balanced, ultra-low frequency main differential amplifier 9 provides the amplification for the system and is shown in block diagram form as it is a conventional structure. Input capacitors 5 and 6 provide AC coupling to prevent an imbalance in the differential amplifier 9 due to variations in the DC electrode-skin contact potentials and sweat chemistry. The output of the main amplifier 9 appears at terminal 10 and is AC coupled to the output terminal 12 of the system by coupling capacitor 11. The values of capacitors 5, 6 and 11 are sufficiently large so as to enable the transmission of ultra-low frequency (0.08 hertz) signals without appreciable attenuation.

In accordance with the invention, a sensing circuit in the form of an auxillary balanced differential amplifier 20 and switching means in the form of two relays $R_1$ and $R_2$ are provided to restore the DC signal levels of the input and output circuits. The input circuit may be restored by equalizing the DC signal levels of the two input terminals 7 and 8 of the main amplifier 9. Thus, relay $R_1$ may be used as shown to short the two terminals together and thereby restore the input circuit. The output circuit may be restored by discharging the output capacitor 11 through resistor 13 to ground. Relay $R_2$ is employed as shown to complete the discharge path.

Actuation of relays $R_1$ and $R_2$ is accomplished by a third relay $R_3$ which is energized in response to a control effect produced by the auxiliary differential amplifier 20. Resistor 31 and capacitor 32 provide a sustaining circuit to maintain energization of input relay $R_1$ for a predetermined length of time after relay $R_3$ releases. This length of time is the amount required to enable the input circuit to attain a balanced operating condition (800 milliseconds for this embodiment). It is especially important to completely balance the input circuit inasmuch as even if only a very small signal differential (e.g. 10mv.) remains at the input circuit, it will be greatly amplified and appear as a transient pulse at the output which in turn will be detected by the sensing circuit and create an oscillatory condition. The output circuit has a much shorter RC time constant than the input circuit, and this output time constant is much shorter than the holding time of relay $R_3$; accordingly, it is unnecessary to provide a sustaining circuit for the output relay $R_2$. Diode 33 permits the energization of relay $R_1$ and the charging of the sustaining circuit but it prevents the discharging of the sustaining circuit through output relay $R_2$. Diode 34 is included to provide a discharge path for suppressing the transient pulse generated when relay $R_2$ is de-energized by the release of relay $R_3$. Arc suppression (for relay $R_3$) is also the reason for including capacitors 25 and 26.

The auxillary amplifier 20 produces the aforementioned control effect whenever it detects a sudden change in the signal voltage at terminal 10. Detection is accomplished by simultaneously coupling the signal appearing at terminal 10 to the two input terminals A and B of the auxillary amplifier 20 through input resistors 21 and 22. The two input circuits are constructed to have different RC time constants, so that a relatively sudden change in the signal voltage at terminal 10 (e.g., a transient pulse) creates a larger pulse at terminal A than at terminal B. The resulting differential pulse appears at the output of the differential amplifier 20 across terminals 23 and 24. This output signal pulse actuates relay $R_3$ to close movable relay contact 30 and thereby establishes a control effect in the form of a voltage at terminal C. A relatively slow change in DC signal voltage (e.g. a cardiac signal), however, is not detected because the signal at terminal A is in this case approximately equal to the signal at terminal B and therefore does not result in an output signal. Thus a cardiac signal does not cause the development of the control effect.

Although in the embodiment shown in FIG. 1 the input circuit RC time constants have been made different by using different values of input capacitance, different values of input resistance may also be used. If input resistors having different values are used, however, the DC biasing of the two transistors will be unequal and the differential amplifier 20 will no longer be balanced. The more practical approach is to use equal-value bias resistors (21 and 22) to maintain a balanced device and use unequal-value capacitors to obtain the time constant difference. For example, capacitor $C_3$ may be a relatively small value capacitor (3 microfarads) which is non-polarized. Capacitors $C_1$ and $C_2$, on the other hand, may be relatively large value capacitors (250 microfarads). The large value of capacitors $C_1$ and $C_2$ necessitates the use of electrolytic capacitors. Therefore, they may be used in conjunction with the diode network formed by diodes $D_1$ and $D_2$ as shown to effectively provide a relatively large value, non-polarized capacitor. In other words, a positive pulse coupled to the amplifier through resistor 22 is blocked by diode $D_1$ and therefore appears across capacitor $C_1$ which is returned to ground through diode $D_2$. A negative pulse coupled through input resistor 22, however, is shunted by diode $D_1$ and blocked by diode $D_2$ and therefore appears across capacitor $C_2$.

The graphical representation shown in FIG. 2 illustrates the difference in the transient response of the amplifier with and without the DC level restorer circuit of the invention. At time equal to zero seconds, a pulse of an amplitude slightly greater than ten millivolts is applied to the input circuit at terminals 1 and 2. Without the DC level restorer circuit the time required for the amplifier to return to its original state (as partially represented by the dashed-line curve) is in the order of one minute. With the DC level restorer circuit, however, the amplifier's transient response time (as represented by the solid-line curve) is reduced to approximately 0.5 seconds.

Thus a new and improved ultra-low-frequency electro-cardioscope amplifier has been provided with a transient response time much shorter than conventional amplifiers. The DC level restorer circuit provides an amplifier that is essentially free from the effects of disruption caused by extraneous interference transients and therefore is not subject to temporary paralysis and consequent interruption of the monitoring capability of the electrocardioscope.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In an electrocardioscope of the type including an AC coupled ultra-low-frequency main amplifier for translating ECG signals, which amplifier includes AC coupling elements normally operating under predetermined DC conditions but subject to disruption by extraneous interference transients leading to temporary paralysis and consequent interruption of the monitoring capability of the electrocardioscope, a system for preventing said paralysis comprising:

an auxiliary balanced differential amplifier operatively connected to said main amplifier and responsive to such transients for developing a predetermined control effect in the form of an output signal; and switching means operatively connected to said differential amplifier and to said coupling elements and selectively responsive to said control effect for establishing said coupling elements at a predetermined DC reference potential and thereby restoring the AC coupling elements to the predetermined DC operating conditions.

2. In an electrocardioscope of the type including an AC coupled ultra-low-frequency main amplifier for translating ECG signals, the main amplifier being of the balanced differential type having two AC coupled input terminals with an AC coupling element and at least one AC coupled output terminal with an AC coupling element, the AC coupling elements normally operating under predetermined DC conditions but subject to disruption by extraneous interference transients leading to temporary paralysis and consequent interruption of the monitoring capability of the electrocardioscope, a system for preventing such paralysis comprising:

means operatively connected to the amplifier and responsive to such transients for developing a predetermined control effect; and switching means operatively connected to said developing means and to said coupling elements and selectively responsive to the control effect for establishing said coupling elements at a predetermined DC reference potential, and thereby restoring the AC coupling elements to the predetermined DC operating conditions, by temporarily connecting said main amplifier input terminals together and temporarily connecting said output terminal to ground.

3. A system as defined in claim 1, in which said auxiliary amplifier has a pair of input circuits, each said input circuit having a different time constant and both said input circuits coupled to said main amplifier, and a pair of balanced output circuits with a relay connected therebetween, whereby said transients unbalance said auxiliary amplifier and operate said relay.

4. A system as defined in claim 2, in which the switching means further comprises means including a holding circuit for maintaining the short circuit between the input terminals for a predetermined period of time longer than the temporary connection of the output terminal to ground.

* * * * *